United States Patent
Garcia

(10) Patent No.: US 6,633,764 B1
(45) Date of Patent: Oct. 14, 2003

(54) APPARATUS, METHOD AND SYSTEM FOR SHORT MESSAGE SERVICE CENTER STORAGE CONTROL

(75) Inventor: José Javier Diez Garcia, Madrid (ES)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/502,757

(22) Filed: Feb. 11, 2000

(51) Int. Cl.[7] .................................. H04Q 7/20
(52) U.S. Cl. .................. 455/466; 455/414; 455/412; 455/461; 455/426
(58) Field of Search .................. 455/466, 566, 455/433, 436, 422, 354, 445, 448, 414, 465, 432, 426

(56) References Cited

U.S. PATENT DOCUMENTS

| | | | | |
|---|---|---|---|---|
| 5,768,509 A | * | 6/1998 | Gunluk | 395/200 |
| 5,933,778 A | * | 8/1999 | Buhrmann et al. | 455/461 |
| 5,946,630 A | * | 8/1999 | Willars et al. | 455/466 |
| 5,950,123 A | * | 9/1999 | Schwelb et al. | 455/414 |
| 5,978,685 A | * | 11/1999 | Laiho | 455/466 |
| 5,999,825 A | * | 12/1999 | Geulen | 455/560 |
| 6,006,098 A | * | 12/1999 | Rathnasabapathy et al. | 455/461 |
| 6,044,275 A | * | 3/2000 | Boltz et al. | 455/466 |
| 6,097,962 A | * | 8/2000 | Corriveau et al. | 455/432 |
| 6,175,743 B1 | * | 1/2001 | Alperovich | 455/466 |
| 6,240,296 B1 | * | 5/2001 | Yu et al. | 455/466 |
| 6,256,498 B1 | * | 7/2001 | Ludwig | 455/433 |
| 6,272,450 B1 | * | 8/2001 | Hill et al. | 370/241 |
| 6,292,668 B1 | * | 9/2001 | Alanara et al. | 455/466 |
| 6,370,390 B1 | * | 4/2002 | Salin et al. | 455/426 |
| 6,424,841 B1 | * | 7/2002 | Gustafsson | 455/466 |
| 6,459,904 B1 | * | 10/2002 | Lorello et al. | 455/466 |
| 6,473,622 B1 | * | 10/2002 | Meuronen | 455/466 |
| 2002/0006125 A1 | * | 1/2002 | Josse et al. | 370/354 |

FOREIGN PATENT DOCUMENTS

| | | |
|---|---|---|
| WO | 99/11087 | 3/1999 |
| WO | 99/23838 | 5/1999 |

OTHER PUBLICATIONS

GSM 09.02, version 6.2.0, Section 23.2.
GSM 09.02, version 7.3.0, Section 17.7.6.

* cited by examiner

Primary Examiner—Dwayne Bost
Assistant Examiner—Khawar Iqbal
(74) Attorney, Agent, or Firm—Burns, Doane, Swecker & Mathis, L.L.P.

(57) ABSTRACT

Apparatus, method and system for short message service center storage control, for allowing control of storage of a Mobile Originating Short Message, sent from an A-subscriber identified by a Mobile Subscriber ISDN number contained in a Mobile Application Part operation Mobile_Originating_Forward_Short_Message, in a Short Message Service Center belonging to a Public Land Mobile Network supporting Network Provider Number Portability. Use is made of a Number Portability Data Base including information specifying, for a plurality of Mobile subscribers identified by Mobile Subscriber ISDN numbers, whether the Mobile subscribers should-be Authorized or Not Authorized to store a Short Message in a Short Message Service Center belonging to the Public Land Mobile Network.

15 Claims, 9 Drawing Sheets

Pr24

```
MO-ForwardSM-Arg ::= SEQUENCE  {
    sm-RP-DA              SM-RP-DA,
    sm-RP-OA              SM-RP-OA,
    sm-RP-UI              SignalInfo,
    extensionContainer    ExtensionContainer    OPTIONAL,
    . . . ,
    imsi                  IMSI                  OPTIONAL }
```

```
MO-ForwardSM-Res ::= SEQUENCE  {
    sm-RP-UI              SignalInfo,
    extensionContainer    ExtensionContainer    OPTIONAL,
    . . . }
```

```
SM-RP-DA ::= CHOICE  {
    imsi                  [0]   IMSI,
    lmsi                  [1]   LMSI,
    serviceCentreAddressOA [4]  AddressString,
    noSM-RP-DA            [5]   NULL  }
```

```
SM-RP-OA ::= CHOICE  {
    msisdn                [2]   ISDN-AddressString,
    serviceCentreAddressOA [4]  AddressString,
    noSM-RP-OA            [5]   NULL  }
```

*FIG. 3*
(Prior Art)

APPARATUS, METHOD AND SYSTEM FOR SHORT MESSAGE SERVICE CENTER STORAGE CONTROL

FIELD

The present invention applies to Mobile Originating Short Message Service in the new scenario appearing as a result of the introduction of Number Portability in mobile networks like, for example, a GSM network.

BACKGROUND

Regulators, first in North America and later Europe, are making efforts to decrease telecommunication costs for society and to facilitate selection of alternative Network Providers as a way to (re)-regulate the industry in order to increase competition.

The disadvantage of having to change a telephone number when moving a subscription to a new network operator has represented a major barrier to the creation of a truly competitive environment. Network Provider Number Portability is therefore being required by regulators, both in mobile and fixed networks. Number Portability allows the end user to keep his/her telephone number when moving the subscription from one network provider to another. Operators are reluctant to introduce Number Portability, and especially, in as much as not all the issues are clear enough to ensure that they will not give services for free to any exported subscriber (that is, to a subscriber who has moved his or her subscription from his or her first network provider to another network provider or operator).

Network Provider Number Portability for mobile networks will be implemented during the next few years, depending on national requirements, although some countries in Europe have already implemented it, with the corresponding great advantages, especially for the end users.

Therefore, most of mobile systems suppliers are now in an intense period of discussing, offering and implementing Number Portability support for a number of customers, namely operators, with mobile network.

The introduction of Network Provider Number Portability in any mobile network implies that the Mobile Subscriber Integrated Services Digital Network number (hereinafter MSISDN) from a subscriber does not any more indicate the Public Land Mobile Network (PLMN) where the subscription is currently kept.

Now, when implementing Mobile Number Portability (hereinafter MNP), problem could arise in connection with the inter-working of MNP with the storage of Short Messages in the Short Message Service Center (hereinafter SC) of the PLMN.

The Short Message Service Center performs the collection and storage of Short Messages, and forwards the Short Messages to the destination end user. Such a Service Center, in charge of storing the Short Messages (hereinafter SM) before said SM are sent to the destination end user, is the Service Center addressed by the subscriber generating and sending the Short Message (i.e., the A-subscriber), and normally the Service Center belonging to the network to which the A-subscriber belongs. This network, in an environment that does not support MNP, can be directly identified by the MSISDN of the A-subscriber.

The Short Messages are stored on a per mobile subscriber basis, wherein each subscriber is identified by his or her MSISDN.

The Mobile Number Portability has been or is going to be introduced in quite a few countries in Europe by law regulations. This forces the suppliers to provide, at least, complete national solution, especially due to the national applicability of regulations.

However, the areas covered by mobile networks do usually or frequently nor coincide exactly with the areas in which a specific national law is enforceable. So, the final solution should not merely work on national premises, but should also fulfill the service performance requirements when the subscriber roams outside his or her Home Public Land Mobile Network (hereinafter Home-PLMN) and/or his or her own Home-PLMN country.

So far, all the efforts made have been focused on normal voice or data calls and the associated signaling, as well as on giving all the required support for the signaling associated to the Subscriber Mobility. As a matter of fact, most of or all the Mobile Terminating Call related signaling and procedures have been solved in one manner or another. In this respect, FIG. 1 shows one possible solution for Mobile Terminating Call signaling further commented hereinafter as Related Art for the present invention.

However, there are still pending issues associated to the Originating side, that is, A-subscriber related features, and especially for Mobile Originating Short Messages, which are not completely solved nowadays under the new scenario turning up once the Mobile Number Portability is introduced.

As already commented, when a mobile subscriber initiates the sending of a Short Message, said Short Message is sent to the SC addressed by said mobile subscriber. According to the new glossary of terms turning up as a result of the introduction of Number Portability, the term "Donor Network" identifies the network from which a subscriber Is ported: the ported number originally belonged to the MSISDN number series assigned to this Donor Network. The term "Recipient Network" corresponds to the network to which the subscriber is ported. Still another interesting term around Number Portability is Portability Domain, which is used to designate the area of the network in which a certain subscriber can move and require Number Portability support.

Once Number Portability is fully supported, the MSISDN will not any longer identify the network holding the subscribers subscription. The subscriber still makes use of his or her original MSISDN, but he or she could hold the subscription with a network operator other than the one indicated by such an MSISDN.

FIG. 2 illustrates how a Mobile Switching Center (hereinafter MSC) will communicate with the SC addressed by the originating subscriber via an inter-Working-MSC. At present, if Number Portability is introduced in a conventional prior art PLMN system, a network operator who does not hold the subscription for a certain mobile subscriber any longer could, however, be giving service for Mobile Originating Short Message Service to said subscriber without getting incomes for such a service. This is a serious problem at present, and a reason for the operators to preclude the introduction of Mobile Number Portability. The present invention has been conceived in order to solve this problem.

Finally, it should be observed that the interface between IWMSC and SC is not standardized, but rather an implementation dependent issue. In most of the implementations for the different markets, and from the different Suppliers, both entities (IWMSC and SC) are co-located in the same node.

RELATED ART

As schematically illustrated in FIG. 2, the Mobile Originating Short Message Service procedure is used to forward a Short Message from a mobile subscriber to a Service Center. An extract from section 23.2 of GSM 09.02 version 7.2.0, Release 1998, has been taken for clarification, and is illustrated in FIG. 2, showing how the following sequence of protocol signaling is sent and received by the intervening entities:

| | |
|---|---|
| Pr21- | Short Message (GSM 04.11) |
| Pr22- | MAP_SEND_INFO_FOR_MO_SMS (*) |
| Pr23- | MAP_SEND_INFO_FOR_MO_SMS_ACK (*) |
| Pr24- | MAP_MO_FORWARD_SHORT_MESSAGE |
| Pr25- | Short message (TS GSM 03.40) |
| Pr26- | Short message Acknowledgement (TS GSM 03.40) |
| Pr27- | MAP_MO_FORWARD_SHORT_MESSAGE_ACK |
| Pr28- | Short Mesage Acknowledgement (GSM 04.11) |

(*) Messages Pr22) and Pr23) are not used by SGSN

Another extract from the standard mentioned above (GSM 09.02 version 7.2.0, Release 1998, Section 17.76) is shown in FIG. 3, illustrating relevant parameters for this discussion. In connection with FIG. 3, please, note the following:

SM-RP-DA: In the mobile originating SM transfer this parameter contains the Service Center address received from the mobile station.

SM-RP-OA: The MSISDN received from the Visitor Location Register (hereinafter VLR) or from the Serving GPRS Support Node (hereinafter SGSN) is inserted in this parameter in the mobile originating SM transfer.

SM-RP-UI: The short message transfer protocol data unit received from the Service Center in inserted in this parameter.

The flow diagram in FIG. 2, in accordance with section 17.7.6 from GSM 09.02 version 7.2.0 Release 1998, shows the signaling between the Mobile Subscriber and the SC in order to store a Mobile Originating Short Message. The only information sent from the MSC or the SGSN to the IWMSC which can allow the latter to identify the subscriber, is the MSISDN.

Said MSISDN, as shown in FIG. 3 (cf. "Pr24"), is sent in the MAP operation MOBILE_ORIGINATING_FORWARD_SHORT_MESSAGE (hereinafter MO_FORWARD_SM), and more specifically, within the parameter SM-RP-OA.

Notice that the parameter "International Mobile Subscriber Identity" (hereinafter IMSI), included in the MAP operation MO_FORWARD_SM, is declared as an optional parameter (cf. FIG. 3). Said optional parameter IMSI in nowadays not taken into account as a way to identify the subscriber, since the MSISDN was a more convenient solution before Number Portability was introduced, and the inclusion of the IMSI to support Number Portability in nor a complete solution yet, as will be clear from the following discussion.

Now, Change Request A175r4 to the Technical Specification GSM 09.02 version 6.2.1., submitted to the European Standards Telecommunications Institute (hereinafter ETSI) and related to Mobile Number Portability, proposed a solution which enables the mobile operators to control the access to the Short Message SCs within their PLMNs from the different subscribers within the Number Portability Domain. However, said solution requires the inclusion of the IMSI in the MAP operation MO_FORWARD_SM, sent from the MSC or the SGSN towards the IWMSC, in order to allow identification of the Home-PLMN of a subscriber by means of his or her IMSI, as the MSISDN alone is not sufficient within an MNP environment.

FIG. 4 basically presents the network entities and associated signaling involved in this solution for a generic scenario, with a PLMN Country (480) supporting MNP and a PLMN country (470) not supporting MNP, and wherein mobile subscribers from both countries are roaming and making use of Short Message Services.

Then, now functionality should be introduced somewhere, either in the IWMSC or in the SC itself, to filter the received Short Messages based on the received IMSI which identifies the PLMN where the subscriber currently has a subscription. Whether this new functionality should be introduced in the IWMSC or the SC is a matter of implementation, given that there is no standard interface to connect the latter two entities. In most of the cases, the IWMSC and the SC are both co-located into the same physical node. For this reason, the present specification refers to both of them as a single logical entity denominated IWMSC-SC, irrespectively of the specific protocol they use for their interconnection. The new means required to control or filter the storage of Short Messages should be introduced in the IWMSC-SC (N400).

Apart from those changes, the above-mentioned proposal based on the inclusion of the IMSI further requires that all the MSCs (N410, N420, N440) and SGSNs (N411, N421, N441) from now on send the IMSI, what is far from being the case at present. There are quite many MSCs within the whole mobile network, and the backward compatibility has to be respected.

FIG. 4 presents a possible scenario where the solution proposed to ETSI (that is, the solution based on the inclusion of the IMSI) might be insufficient to justify the amount of work involved with the upgrading of the nodes of the network. At the same time, it offers the operators strong arguments in favor of delaying the introduction of Number Portability, at least until a safer solution is available.

In FIG. 4, when any subscriber belonging to a Home-PLMN country (480), wherein MNP is fully supported, roams into another PLMN country (470) which does not support MNP, the MSC or SGSN where such a subscriber is roaming will not likely send the corresponding IMSI to the subscriber's HPLMN (450).

FIG. 4 shows the most common scenario with interfaces connecting co-operating entities for the sake of clarity. In addition, some of these interfaces and entities—in bold and indicated by reference numerals—identify different possibilities commented below:

i) Assuming that the Home-PLMN (450) supports the above-mentioned solution (inclusion of IMSI), then the MSC (N410) or SGSN (N411) of said Home-PLMN should have been updated or upgraded to obtain the IMSI from a data base (namely the VLR (N402)) and then submit it to the IWMSC-SC (N400) in the MAP operation MO_FORWARD_SM, through them corresponding interfaces (S410, S411). Either the IWMSC or, more likely, the SC, in any case the logical entity IWMSC-SC (N400), should have been upgraded to filter messages from subscribers to whom the system should give Short Message Service. The solution based on the inclusion of the IMSI would work in this case.

ii) Assuming that a Visited-PLMN (460) within the Home-PLMN country (480) supports the above-mentioned IMSI-based solution, in that case, the Visited-PLMN Should, theoretically, have been upgraded in the same way an the Home-PLMN (450) mentioned in the preceding paragraph, that is, the MSC (N420) and SGSN (N421) should then have been upgraded to obtain the IMSI from a data base (the VLR of the network)) and then to submit it to the IWMSC-SC (N400) in the MAP operation MO_FORWARD_SM, through the corresponding interfaces (S420, S421). However, these assumptions are, very risky, since in spite of the fact that the law regulations oblige the operators to support Number Portability, the law regulations can hardly oblige all the national operators to implement a solution in the similar way and exactly at the same time. For example, some operators could upgrade their whole network very quickly whereas others could be slower. In the meantime, some operators might be giving service for free to customers who changed subscription to another network. Another possibility is that the applicable laws are not approved until the situation is clarified, or all the networks in the country upgraded, what would be a disadvantage for the and-users (due to the corresponding delay in the implementation of Mobile Number Portability).

iii) No faithful assumptions can be made about a PLMN country (470) where MNP is not supported, with regard to visitor subscribers from a PLMN where MNP is supported. In principle, there is no reason for an operator in the country where MNP is not supported to upgrade the MSC (N440), SGSN (N441) and IWMSC-SC (N401) in its network, since Number Portability is not mandatory in this country and, consequently, the local operators do not need to take any action for national subscribers. National subscribers in said country (470) would address their messages from the MSC (N440) or SGSN (N441) towards their own IWMSC-SC (N401) through the respective interfaces (S430, S431). Also notice that subscribers in said PLMN that are addressing, via the corresponding interfaces (S440, S441), an IWMSC-SC (N400) in another PLMN country (480) for the purpose of sending a Mobile Originating Short Message, will be easily detected since the Country Code (CC) in their MSISDN will never be misunderstood in an MNP domain. Thus, it can be assumed that, at least during a certain period, there is no need for the PLMN in the country (470) that does not support MNP to update its behavior in what regards inclusion of the IMSI.

iv) When a mobile subscriber from a Home-PLMN country (480) supporting MNP roams into a PN country (470) not supporting MNP, the information sent from the visited MSC (N440) or SGSN (N441) towards an IWMSC-SC (N400) located in the PLMN country (450) supporting MNP should include the IMSI of the subscriber. However, in a situation like the one described in the preceding paragraph, the visited PLMN not supporting MNP has no internal need to be upgraded in order to send such an optional IMSI, which, as mentioned above, is not really used nowadays. Especially, when the visited network, without supporting MNP, can still work perfectly for its own subscribers without sending the optional IMSI anywhere. So, the information sent from the roaming subscriber will not be complete enough to safely identify his or her Home-PLMN at the addressed IWMSC-SC (N400), as the MSISDN only specifies the PLMN with which the subscriber originally kept his subscription.

In a situation like the one described in items iii) and iv) above, there is no reason for the local operator in a country not supporting MNP to update a PLMN not supporting MNP in order to include the subscriber IMSI. Consequently, the Mobile Originating Short Messages will arrive to the IWMSC-SC and this entity will not be able to safely detect whether the messages have been sent from subscribers who are authorized to store Short Messages in the SC, or from subscribers who are not authorized, for example, due to the fact that they do not any longer keep their subscriptions with the network of the IWMSC-SC; as outlined above, the MSISDN itself is nor sufficient in an environment supporting MNP.

As a result, it could be concluded that the solution outlined above, that is, the solution based on the inclusion of the IMSI, is not a complete solution to the problem, as it does not cover all possible cases. The problem is that the inclusion of the IMSI might be performed only by MSCs or SGSNs within PLMNs where MNP is supported.

Further, this solution requires upgrading of all MSCs, SGSNs and IWMSCs within a PLMN, as the IMSI was not always sent previously. Thus, the IMSI-based solution appears to be rather expensive.

Further, the Mobile Number Portability will be introduced in some countries by, law, but it is not likely to be required in all countries, at least not at the same time. This makes its introduction quite difficult to synchronize. Besides, the corresponding upgrading of the network in all the relevant countries can hardly be achieved for all of them simultaneously. This makes it even more necessary to obtain a complete solution which requires adaptations on a per PLMN basis, so that any operator will be able to appropriately filter Short Messages addressing its own SC from subscribers who do not have subscription in its network any longer. Especially, it is desirable that the operator will be able to carry out the necessary adaptations of the network without having to depend on how other operators will be upgrading their networks.

On the other hand and as another example of the existing prior art, Ericsson has already delivered a partial solution for Mobile Number Portability to some mobile operators. Said partial solution does not intend to solve the problem discussed above, related to Mobile Originating Short Messages, but relates to problems involved with reaching a subscriber, that is, a B-subscriber, who has been ported to another mobile network than the one addressed by his or her MSISDN.

This already known solution to problems involved with reaching mobile subscribers (B-subscribers) in an MNP environment, is based on the introduction of a new entity, the Flexible Numbering Register (hereinafter PNR) (the FNR as such is referred to in, for example, WO-A-99/23838). In accordance with the FNR-based solution, all Mobile Terminating signaling routed on MSISDN, and which was previously sent to the Home Location Register (hereinafter HLR), is now sent to the FNR.

Said FNR consists of two main parts: the Signaling Relay Function means (hereinafter SRP) and the MAP Analysis Function means FIG. 6 illustrates schematically the internal functional diagram of such an FNR entity, applicable to both Call-related and Non-Call-related signaling (Fb600). The FNR includes, in addition to the SRF means (61) and the MAP Analysis Function means (62), a data base (63).

Furthermore, FIG. 1 and FIG. 5 respectively illustrate the scenario for Call-related and Non-Call-related procedures, and in both cases applying to the B-subscriber.

Under the scenario illustrated in FIG. 1, the Gateway-MSC (hereinafter GMSC) (N100) interrogates (S100) the FKR (N110) about Call-related issues of the Called Subscriber, by using his or her MSISDN as Called Party Address (hereinafter CdPA). Provided that the subscriber is "home" or "imported", that is, provided that the subscriber currently has his subscription with the PLMN (130), the interrogation is relayed (S110) to the corresponding HLR (N111). From the HLR onwards, the procedures are conventional and do not require any further explanation. However, if the subscriber belongs to another PLMN (140), and assuming that the MAP operation is Call-related (e.g., a Send_Routing_Info (hereinafter SRI)), an answer is generated and returned back (S120) to the GMSC (N100).

With the information received from the FNR, the inquiring GMSC (N100) will re-route the interrogation to the corresponding GMSC (N101) in the other PLMN (140). The receiver GMSC (N101) interrogates (S122) the FNR (N120) in its own PLMN and then, unless there are protocol errors, the interrogation is relayed (S123) to the destination HLR (N121). As for the previous case, from HLR onwards, the procedure is exactly the same as before introducing MNP.

Under the scenario described in FIG. 1, FIG. 6 illustrates the internal FNR structure and how the FNR behaves to perform the actions related to FIG. 1.

So, as illustrated in FIG. 6, the Called Subscriber MSISDN, received as CdPA in the interrogation (S100) from GMSC (N100), is checked versus the contents of the data base (63) in order to analyze MNP criteria (Fb630). Provided that the subscriber is "home" or "imported" (that is, that the subscriber currently has his or her subscription with the PLMN of the FNR) (Fb610), the CdPA is changed (Fb611) to address the corresponding HLR (N111) in the Home PLMN where subscription data for the subscriber are stored, and the protocol message is relayed (S110) to said HLR (N111).

But, according to FIG. 6, if the subscriber belongs to another network (Fb620), the received MAP Operation is passed to the MAP Analysis Function (Fb621). This part is responsible for analyzing the MAP operation received, and extracting the required parameters. Assuming that the MAP operation is Call-related (Fb601), for example an SRI, an answer is generated and returned back (S120) to the GMSC (N100).

Under the scenario in FIG. 5, the GMSC (N500) interrogates (S500) the FNR (N510) about Non-Call-related issues of the Called Subscriber, by using his or her MSISDN as CdPA. Provided that the subscriber is "home" or "imported" (that is, that the subscriber currently has his or her subscription with the PLMN of the FNR), the interrogation is relayed (S510) to the corresponding HLR (N511). From the HLR onwards, the procedures are exactly the same as conventionally, and need no further explanation. However, if the subscriber belongs to another network, and assuming that the MAP operation received in the FNR (N510) is Non-Call-related, said MAP operation is relayed (S520) to the recipient network, for example, to an FNR (N520) thereof, or just to an HLR.

With the information stored at the recipient network FNR (N520), the received MAP operation, unless there are protocol errors, in passed (S530) to the corresponding HLR (N521). As for the previous case, from HLR onwards, the procedure is exactly the same as before introducing MNP.

Under the scenario illustrated in FIG. 5, FIG. 6 presents the internal FNR structure and how the FNR behaves to perform the actions related to FIG. 5.

So, according to FIG. 6, the Called Subscriber MSISDN, received as CdPA in the interrogation (S500) from GMSC (N500), is checked versus data base (63) contents to analyze MNP criteria (Fb630). Provided that the subscriber is "home" or "imported" (Fb610) (that is, provided that the subscriber currently has his subscription with the PLMN to which the FNR belongs), the CdPA is changed (Fb611) to address the corresponding HLR (N511) in the Home PLMN where subscription data for the subscriber is stored, and the protocol message is relayed (S510) to said HLR.

But, according to FIG. 6, if the subscriber belongs to another network (Fb620), the received MAP Operation is passed to the MAP Analysis Function (Fb621). This part is responsible for analyzing the MAP operation received, and extracting the required parameters. Assuming that the MAP operation is Non-Call-related (Fb602), the SRF means (61) functionality is invoked (Fb631) to relay (S520) the same received MAP operation to the recipient network (N660) which, in particular, could include another FNR (N520), or just an HLR.

Summarizing the internal FNR structure presented in FIG. 6, all messages routed on MSISDN are received by the SRF means (61) first, and then, depending on the interrogating entity and on the subscriber type, the messages are either relayed on Signaling Connection Control Part (hereinafter SCCP) (64) level or sent to the MAP analysis function means for further analysis. The MAP analysis function decides then, depending on the type of operation, whether the message is relayed on SCCP (64) level or answered.

SUMMARY

In view of the related art referred to above and as known by the inventor, it is clear that a serious problem related to the introduction of MNP in due to the methods currently used in order to identify the subscriber sending a Mobile Originating Short Message.

On the one hand, the MSISDN, which previously always identified the Home-PLMN of the originating subscriber (A-subscriber) in order to control access to the SC where the Short Message sent by said A-subscriber should be stored until further delivery to the called subscriber (B-subscriber), does not necessarily indicate the current Home-PLMN of the A-subscriber in an MNP environment.

On the other hand, the above-mentioned solution based an always sending the IMSI in order to unambiguously identify the subscriber sending a Mobile Originating Short Message, requires a complete and synchronized network upgrade performed simultaneously by all the network operators, including operators of PLMNs in countries where MNP is still not required. Thus, the solution based on the sending of the IMSI seems to be rather difficult to implement to an extent that is sufficient so as to guarantee that the IMSI will always be sent, that is, also when a subscriber is roaming in a PLMN that does not support MNP, as discussed above.

Thus, there is a need to solve the problems outlined above, and especially to solve them in a manner that will allow each network operator to implement the solution without having to rely on the plans that other network operators have for implementing the same or similar solutions in their own networks.

Thus, the main object of the present invention is to provide a complete and reliable solution which will allow an individual network operator to overcome the above-mentioned problems without having to rely on the plans of other operators and/or on the implementation of law regulations concerning MNP in other countries, and which can be implemented with a minimum upgrade of the currently existing network.

These objects of the present invention are achieved by means of the apparatus, method and system as claimed.

Basically, the present invention relates to an apparatus and to a system for short message service center storage control, for allowing control of storage of a Mobile Originating Short Message, sent from an A-subscriber identified by an MSISDN contained in a Mobile Application Part MAP operation Mobile_Originating_Forward_Short_Message (hereinafter MO_FORWARD_SM), in a Short Message Service Center belonging to a PLMN supporting MNP. The apparatus and the system comprise at least one Number Portability logical entity including:

a Number Portability Data Base including information specifying, for a plurality of Mobile Subscribers identified by MSISDNs, whether said Mobile Subscribers should be Authorized or Not Authorized to store a Short Message in an SC belonging to said PLMN;

Signaling Relay Function (SRF) means capable of relaying a MAP operation MO_FORWARD_SM to an IWMSC; and Mobile Application Part (MAP) Analysis Function means arranged to check, for a Mobile Application Part operation MO_FORWARD_SM sent from an A-subscriber and received by said Number Portability logical entity, and by means of using said Number Portability Data Base, whether the corresponding A-subscriber is Authorized or Not Authorized to store a Short Message in an SC of the PLMN, said HAP Analysis Function means being arranged so that:

a) if the A-subscriber is found to be Authorized, the MAP Analysis Function means indicates to the SRF means that it should relay the MAP operation MO_FORWARD_SM to the IWMSC; and b) if the A-subscriber is found to be Not Authorized, the MAP Analysis Function means rejects the MAP operation MO_FORWARD_SM.

The means to reject said MAP operation could be the issue of a REJECT operation, or other protocol means such as The issue of a TC-ERROR primitive, for example, as anyone skilled in the art can easily derive from this specification. Throughout the present specification, the reject of a MAP operation is generally used to describe the effect to produce rather than to explicitly determine the means to carry out such a rejection and without limiting the scope of the present invention.

In the system, the Number Portability local entity is functionally interposed between a node of the network (such as an MSC or an SGSN) and the IWMSC (or IWMSC-SC, as referred to in the instant specification). Thus, a MAP operation MO_FORWARD_SC sent from the node and directed towards the IWMSC can be analyzed and handled by said Number Portability logical entity, before reaching said IWMSC.

The invention also relates to a method for short message service center storage control, for allowing control of storage of a Mobile Originating Short Message, sent from an A-subscriber identified by a MSISDN contained in a MAP operation MO_FORWARD_SM, in an SC belonging to a PLMN supporting Network Provider Number Portability. The method comprises the following steps:

receiving a MAP operation MO_FORWARD_SM sent from an A-subscriber;

checking, in a Number Portability Data Base and by using the MSISDN received in the MAP operation MO_FORWARD_SM, whether said A-subscriber is Authorized or Not Authorized to store a Short Message in an SC of the PLMN; and a) if the A-subscriber is found to be Authorized, relay the MAP operation MO_FORWARD_SM to an IWMSC of said PLMN; and b) if the A-subscriber is found to be Not Authorized, reject the MAP operation MO_FORWARD_SM.

In accordance with the invention, it is possible to arrange the Number Portability Data Base so that only A-subscribers who are subscribers to the PLMN are Authorized, but it is also possible to arrange the data base so that selected A-subscribers that are not subscribers to the PLMN are Authorized, for example, in accordance with criteria established by the operator of the PLMN. For example, the operator may allow subscribers to selected PLMNs, with which the operator may have reached agreements regarding Short Message Service, to store Short Messages in an SC of the operator's PLMN, even though they do not keep their subscription with said operator's PLMN.

The Number Portability logical entity can be arranged to return a rejected MAP operation MO_FORWARD_SM to the MSC or to the SGSN from which it was received.

Basically, the Number Portability logical entity can be considered to be a Mobile Originating Number Portability Register.

The Number Portability logical entity, hereinafter referred to as the Mobile Originating Number Portability Register (hereinafter MO-NPR), can be inserted between the MSC or SGSN from which the MO_FORWARD_SM is received, and the IWMSC of the PLMN, as outlined above.

The main activity to be performed by the MO-NPR is the analysis of attempts to store Short Messages in the SC of the PLMN. As a result of the analysis, the Originating Subscriber is either authorized or not authorized to submit his or her Mobile Originating Short Message for storage into the SC of the PLMN.

More specifically, and as a further object of the present invention, the result of such an analysis indicates the current Home-PLMN of the Originating Subscriber (A-subscriber); the Number Portability Data Base includes information specifying, for each MSISDN, the current Home-PLMN corresponding to subscriber having said MSISDN. Said Originating Subscriber could have been exported to other network than the one identified by the MSISDN, but this will appear from the contents of the Number Portability Data Base. Now, once the current Home-PLMN of the Originating Subscriber is checked, the system can, in accordance with a preferred embodiment of the invention, analyze whether subscribers of said current Home-PLMN are authorized to store Short Messages in the SC of the PLMN, for example, due to a bilateral agreement between the two PLMNs. If they are authorized, the MAP operation MO_FORWARD_SM is relayed to the corresponding IWMSC-SC of the PLMN. Otherwise, the requested operation is rejected back to the originating entity.

At a first look, one might think that the upgrading of all the existing relevant entities to support the solution based on the inclusion of the IMSI could be simpler and require a smaller input of effort and costs, if compared to the design of the MO-NPR and the incorporation thereof into the PLMN. However, as outlined above, the upgrading required by the solution based on the inclusion of the IMSI is difficult, not only due to the need to upgrade a substantial amount of nodes, but also due to the synchronization requirements mentioned above Contrarily, the MO-NPR can be implemented by the individual operator and allows him to overcome the problems mentioned above, without having to upgrade a large number of nodes and without any need for synchronization with the other network operators. That is, by means of the present invention, an operator wanting to control the storage in the SC of its own PLMN, only need to add the MO-NPR to the PLMN, thereby overcoming the above-mentioned problems in one step and without having to wait for all the other operators (in the PLMN country and abroad) no modify their PLMNs. The implementation of the MO-NPR appears to be simpler and easier than upgrading a large amount of nodes in different PLMNs, nodes which could have been provided by different suppliers, and which could still require the verification of several interfaces after upgrading.

Furthermore, the solution proposed does not imply any extra signaling between any network nodes. This is due to the fact that the MO-FORWARD-SM message received from the interrogating MSC or SGSN is either directly relayed or directly responded. Therefore, there is no increase in signaling in the PLMN.

The implementation of this new logical entity can be carried out applying any suitable design criteria, as it should be clear to anyone skilled in the art. The preferred embodiments of the invention disclosed herein are described only to facilitate the comprehension of the invention and without limiting the scope of the present invention.

BRIEF DESCRIPTION OF THE DRAWINGS

FIG. 3 shows the prior art MAP operation Mobile__Originating__Forward__Short__Message, as described by GSM recommendations, in terms of Operation and Parameters.

DESCRIPTION

Figure 7:
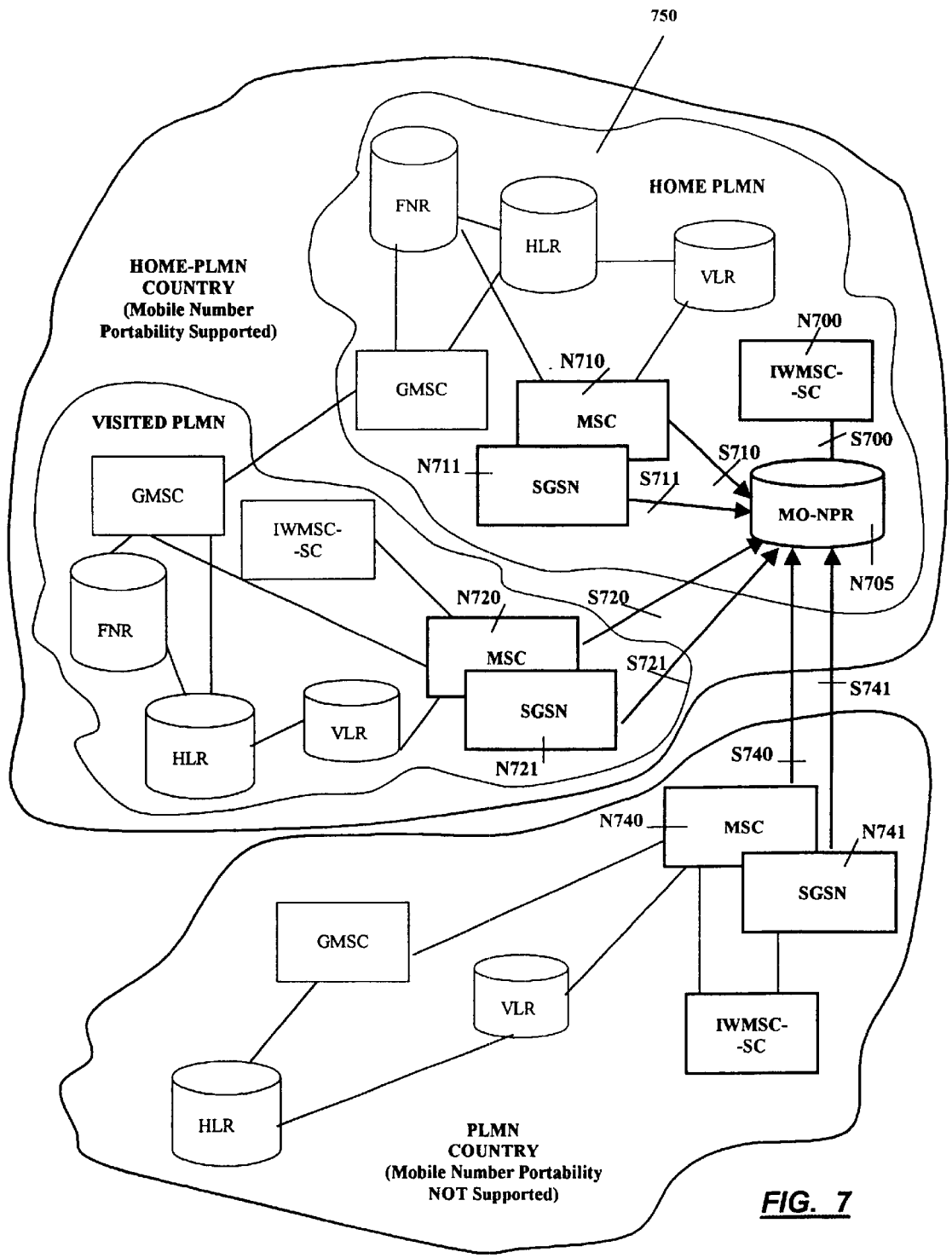
FIG. 7 presents a scenario analogous to the one shown in FIG. 4, but in which an MO-NPR is interposed between the MSCs or SGSNs and the IWMSC-SC of the PLMN, in accordance with a preferred embodiment of the present invention.
Figure 8:
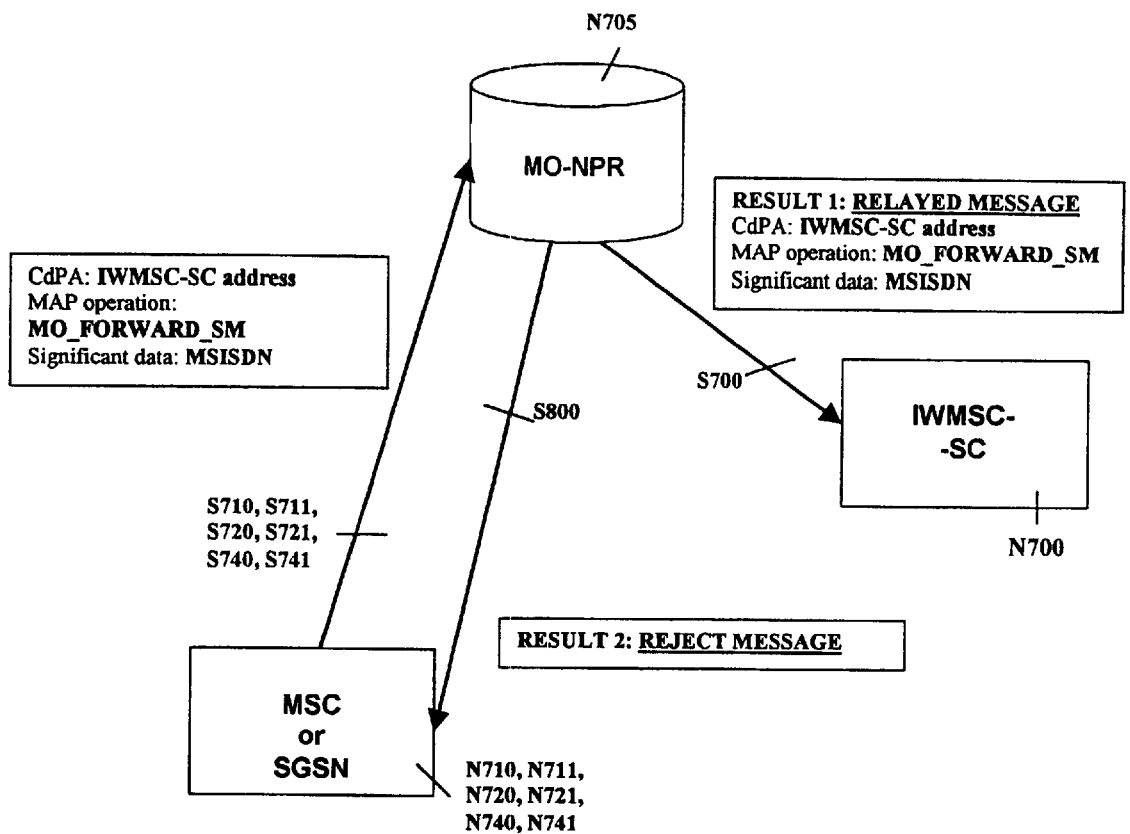
FIG. 8 schematically illustrates the interfaces of the MO-NPR, in accordance with a preferred embodiment of the present invention.
Figure 9:
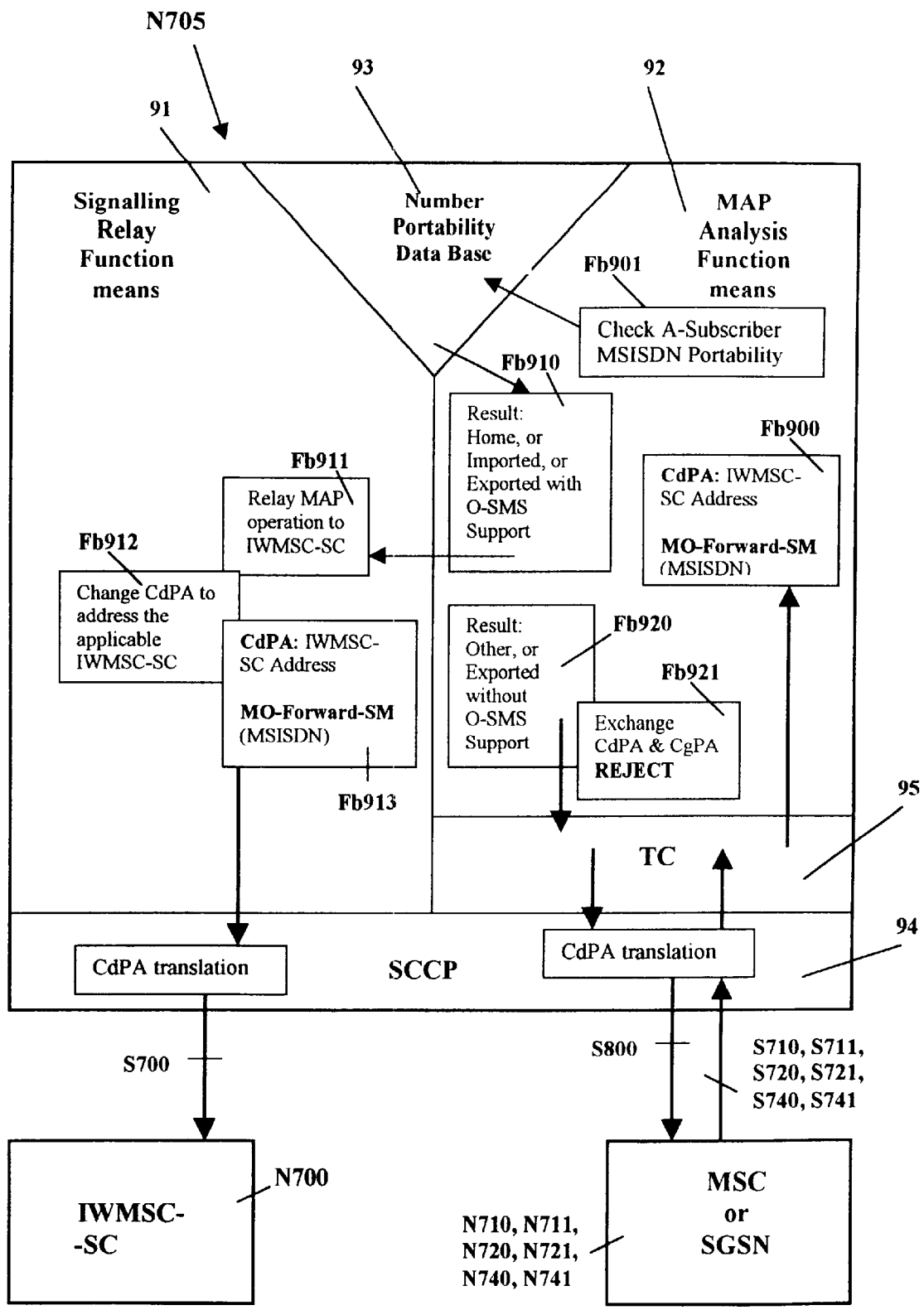
FIG. 9 illustrates a functional block diagram of the MO-NPR, in accordance with a preferred embodiment of the present invention.

FIGS. 7–9 have been included in order to illustrate some aspects of some preferred embodiments of the invention, to be described hereinafter, in an illustrative and non-restrictive manner.

Figure 1:
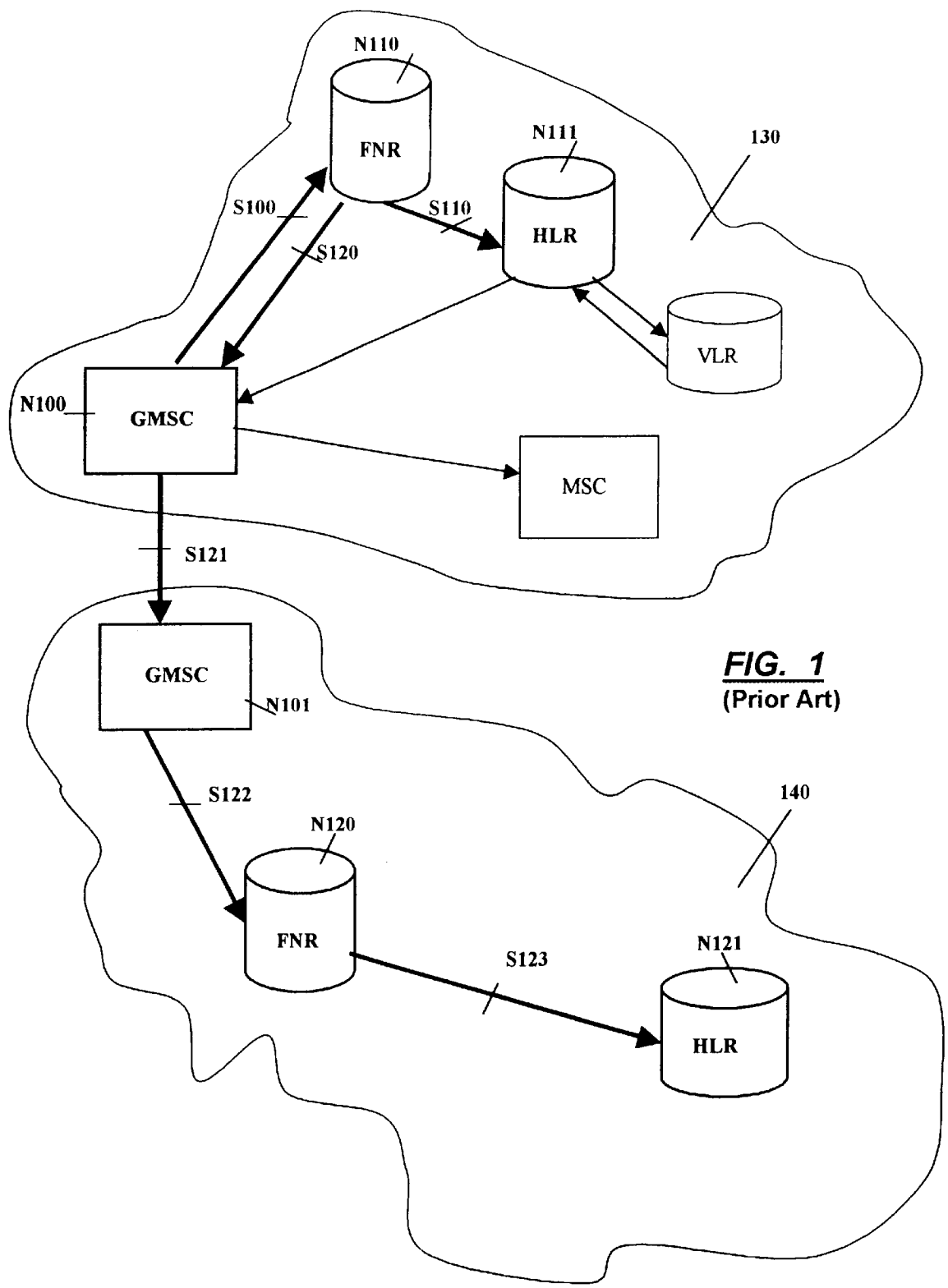
FIG. 1 illustrates a prior art configuration related to Mobile Terminating Call-related procedures within the Number Portability environment.
Figure 2:
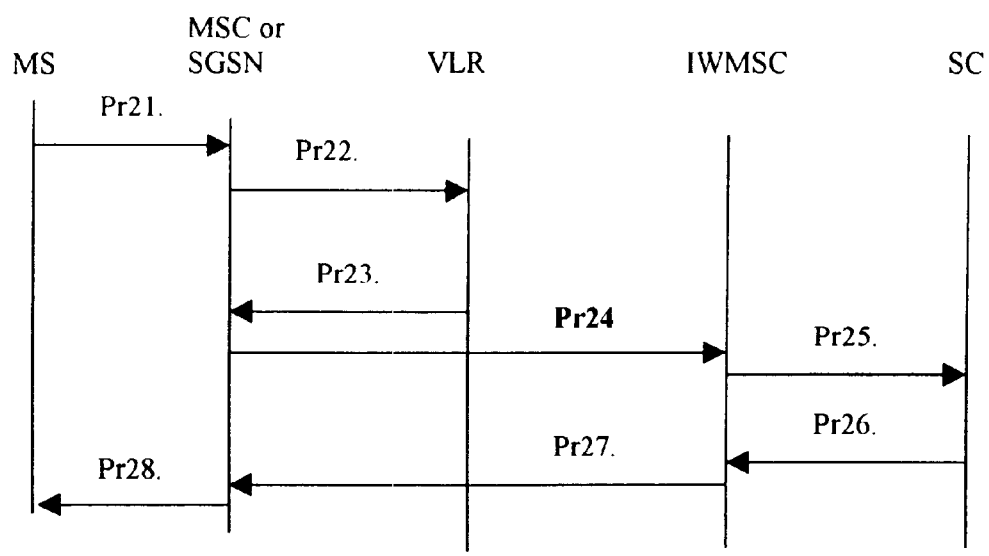
FIG. 2 schematically shows a prior art flow diagram of the signaling between the different entities involved in the Mobile Originating Short Messages procedures, from the Mobile station to the Service Center.
Figure 4:
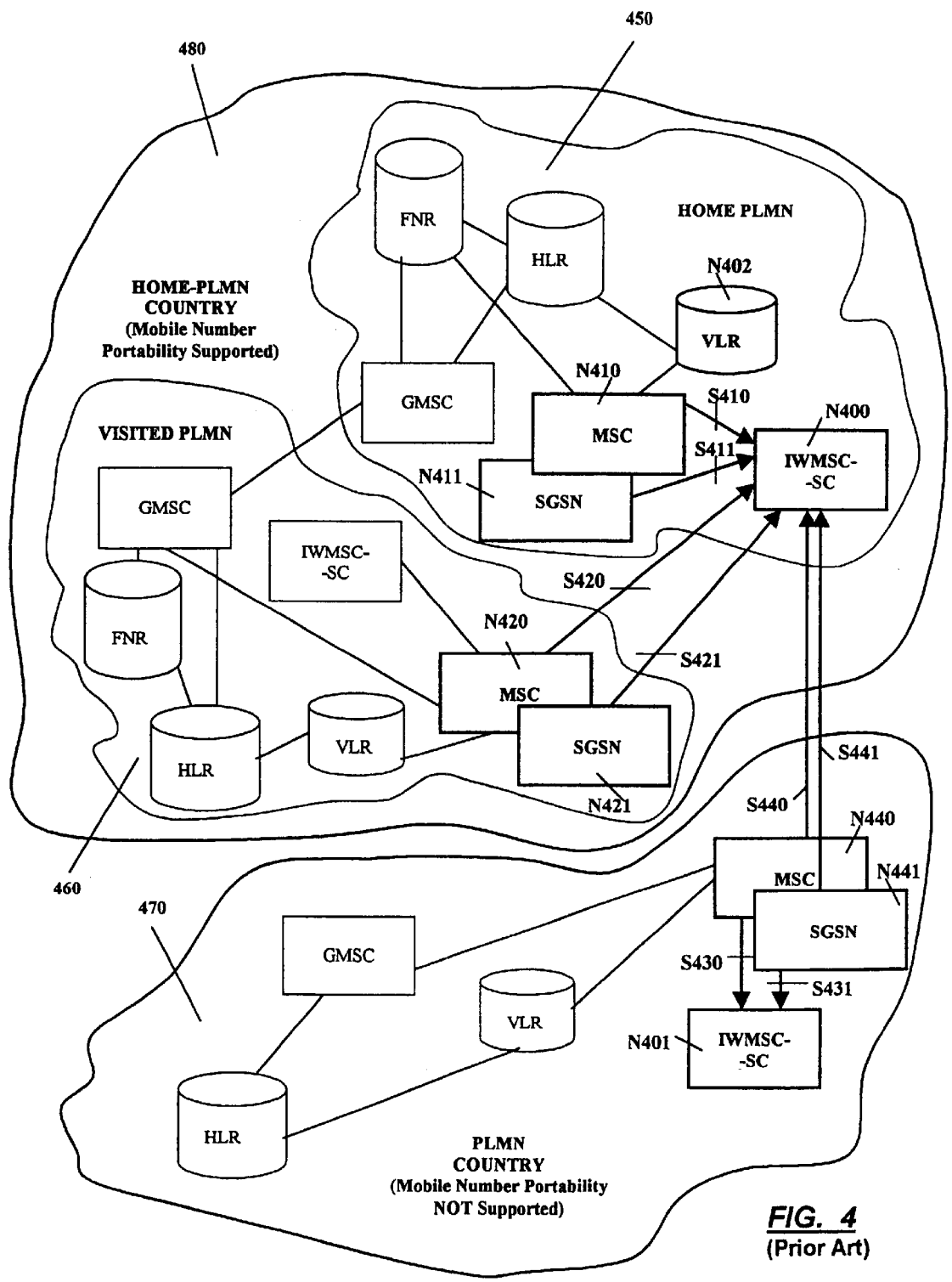
FIG. 4 presents a generic prior art scenario, especially related to Mobile Originating Short Messages, wherein, a Home-PLMN Country supporting Mobile Number Portability and with a Home and a Visited PLMN inter-work with a Visited PLMN country.
Figure 5:
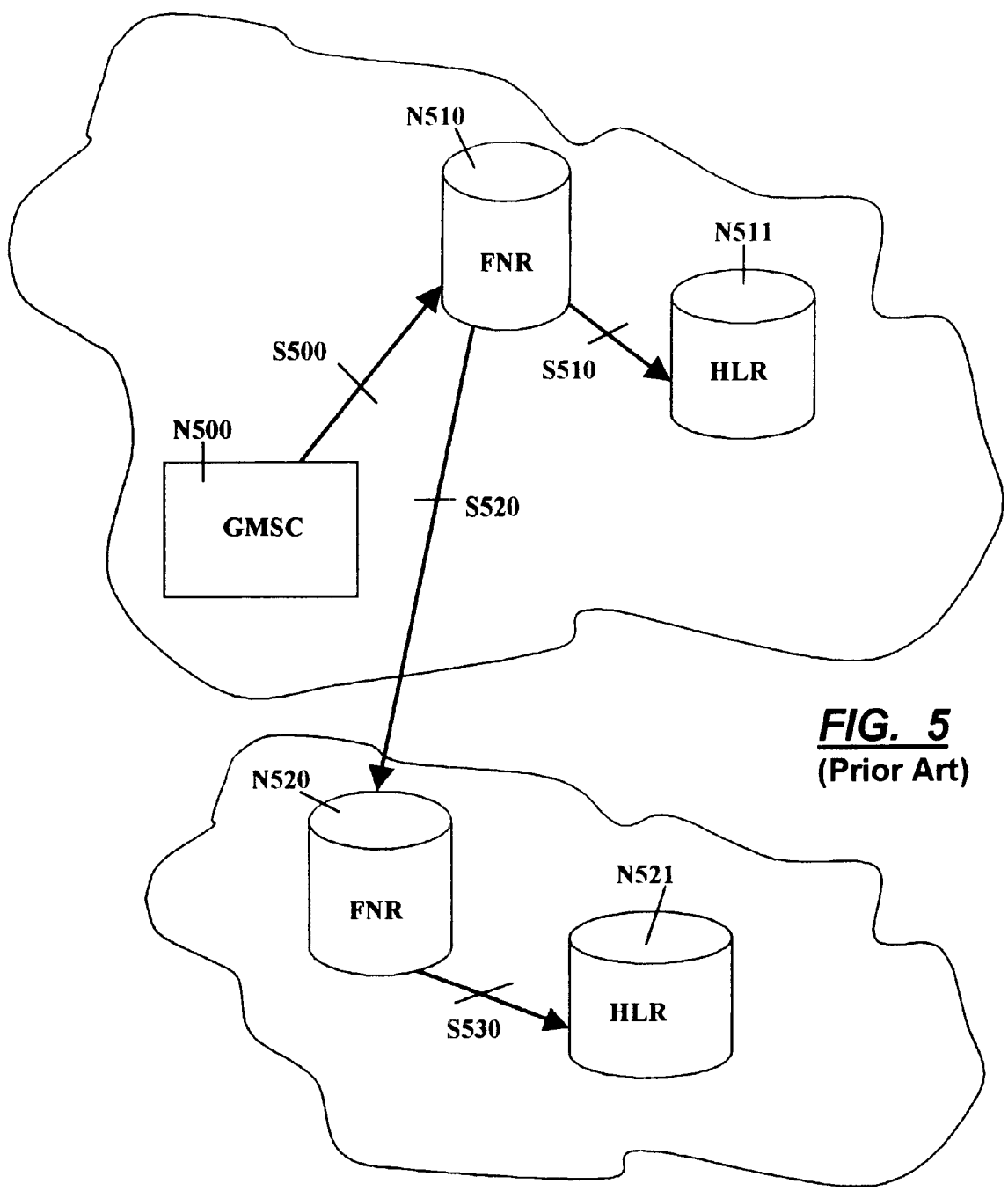
FIG. 5 basically illustrates a prior art configuration related to Mobile Terminating Non-Call-related procedures within the Number Portability environment.
Figure 6:
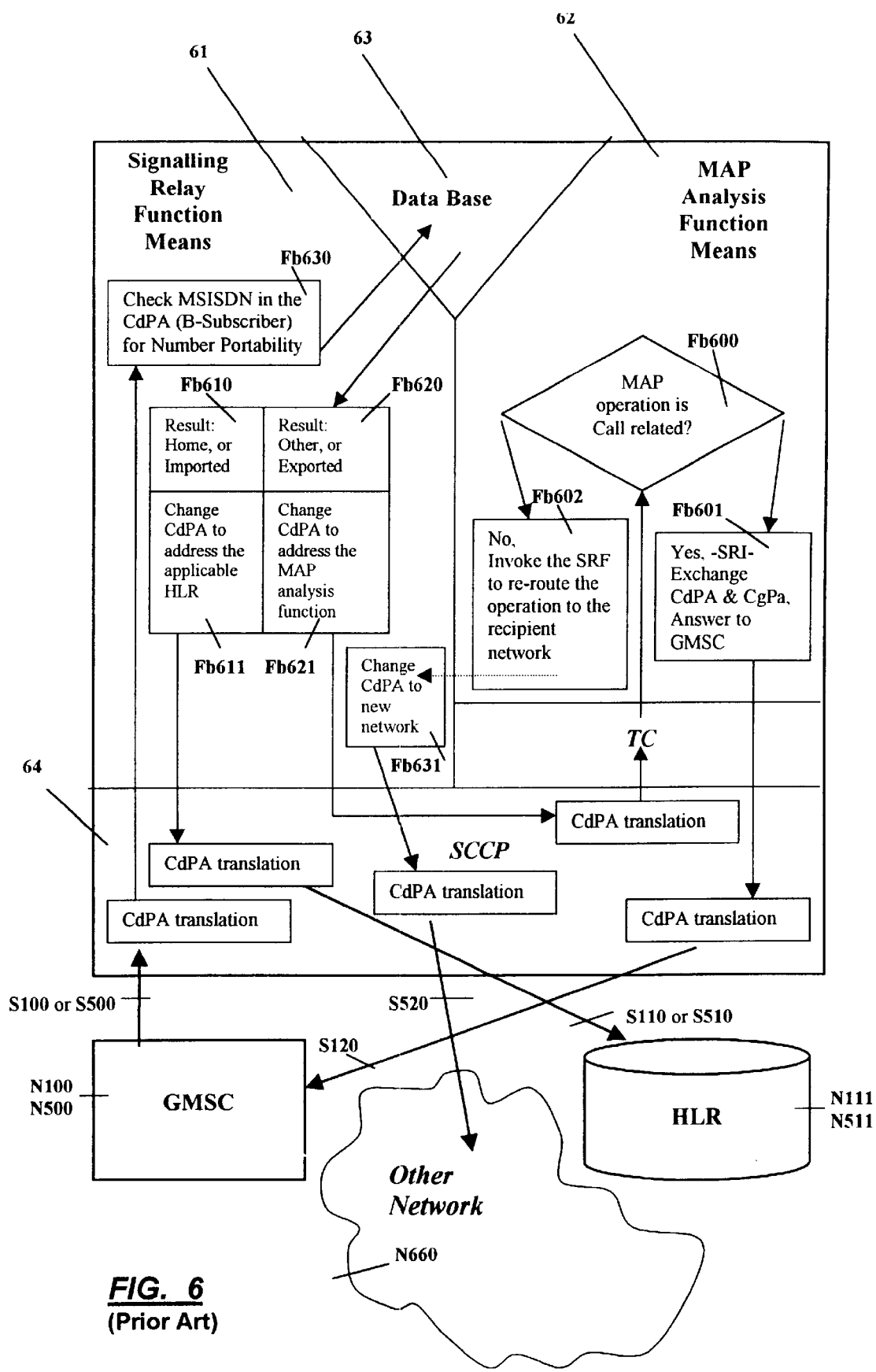
FIG. 6 basically illustrates a functional block diagram of the Flexible Numbering Register, according to a prior art configuration for Mobile Terminating Call and Non-Call related procedures.

First of all, considering FIG. 7, this figure illustrates a scenario analogous to the prior art scenario illustrated in FIG. 4, but with the difference that in the Home-PLMN (750) illustrated in FIG. 7, the MO-NPR (N705) has been interposed, so that 411 signaling from MSCs or SGSNs to the IWMSC (or IWMSC-SC) of the Home-PLMN will be "filtered" by the MO-NPR.

According to the present invention, and as shown in FIG. 8, the MO-NPR (705) receives and analyzes the MAP operations for which A-subscriber related MNP criteria have to be checked. More specifically, the MO-NPR (N705) receives the MAP operation MO-FORWARD__SM (S710, S711, S720, S721, S740, S741) from the sender entity, such as the MSC (N710, N720, N740) or the SGSN (N711, N721, N741) of a PLMN. Then, the MO-NPR extracts the relevant data and parameters from the received MAP operation to check the A-subscriber related MNP criteria, by means of reading the MSISDN of the A-subscriber (this MSISDN is included in the MO-FORWARD-SM) and checking, in the Number Portability Data Base, whether the A-subscriber is authorized or not to store his or her Mobile Originating Short Message into the SC of the PLMN. As a result of said analysis, the MO-NPR either enables the relay of the MAP operation MO__FORWARD__SM towards (S700) the appropriate SC of the PLMN (that is, to the IWMSC or IWMSC-SC (N-700)), or rejects (S800) the received MAP operation back to the sender entity.

The MO-NPR could be implemented as an isolated node in the PLMN network; this approach could be advantageous, for the reasons explained above and in order to minimize the impacts on the existing network and signaling. However, any person skilled in the art will easily understand that the MO-NPR could obviously be colocated with any existing entity, as long as the MO-NPR, from a functional point of view, will be interposed between the sending MSC or SGSN and the IWMSC-SC to which the MAP operation is directed by the A-subscriber. In the case that the MO-NPR is colocated with any other existing entity, the protocol signaling between them would just be mapped into internal and technology-dependent signaling, whereby the requested modifications to be made could be easily performed by any person skilled in the art.

Now, under the scenario illustrated in FIG. 7 and in accordance with the general approach suggested and illustrated in FIG. 8, FIG. 9 illustrates a preferred internal structure for the MO-NPR, and schematically illustrates how the MO-NPR (N-705) is arranged and behaves to perform the actions outlined in FIG. 7, in accordance with a preferred embodiment of the invention.

Thus, in accordance with FIG. 9, the Mobile Originating Subscriber MSISDN, received as a parameter data within the MAP operation MO__FORWARD__SM, is extracted from the contents of said MAP operation, along with the CdPA to which such a MAP operation was submitted (Fb900).

It should be noted that even though the MAP operation is received by the MO-NPR that has been interposed between the sender entities MSC (N710, N720, N740) or SGSN (N711, N721, N741) and the destination entity IWMSC-SC (N700), said CdPA above actually address the IWMSC-SC (N700). Thus, the routing tables should be modified in such a way that signaling addressing the IWMSC-SC should firstly arrive at the MO-NPR, and from there either be relayed to said IWMSC-SC or be rejected to the sender entity.

This MAP Operation had been invoked within a Transaction Capability (hereinafter TC) dialog from the originating entity, MSC or SGSN. The TC layer (95) means deals with protocol aspects and extracts the corresponding MAP Operation, in this case, the MO__FORWARD__SM, where-after said MAP operation in delivered (Fb900) to the application layer of the MO-NPR for further process. The way the TC layer means (95) deals with signaling System #7 issues (hereinafter SS7) is nor considered to require any further explanation.

Once the mobile Originating Subscriber MSISDN and the CdPA, the latter identifying the IWMSC-SC selected by said subscriber to store the Originating Short Message, have been determined from the incoming MAP operation, the MAP Analysis Function means (92) makes a query to the Number Portability Data Base (93) to check the A-subscriber MSISDN MNP criteria (Fb901), that is, to check whether the A-subscriber identified by the MSISDN is authorized or nor authorized to store a Short Message in the SC of the PLMN.

As a result from the query, and provided that the subscriber is authorized to store a Short Message in the SC (Fb910), the Signaling Relay Function means (91) in the MO-NPR (N705) is invoked to relay (Fb911) the received MAP operation, namely MO_FORWARD_SM, to the corresponding IWMSC (in this specification also referred to as IWMSC-SC) (N700). In this respect, the subscribers with support for Mobile Originating Short Messages from the current PLMN (that is, the A-subscriber who should be authorized to store their Mobile Originating Short Messages in the SC of the PLMN) are the "home" (that is, the subscribers which from the beginning have had their subscription with the PLMN) and the "imported" (that is, the subscribers which previously had their subscription with another PLMN but which have later ported their subscription to the new PLMN (N750) subscribers. However, also exported subscribers and normal subscribers from any other PLMN could be given support for Mobile Originating Short Message Service under certain premises, which could be established by the operator (for example, on the basis of bilateral agreements with other operators), and thus be defined as "authorized" subscribers in accordance with tho present invention. Of course, the operator could also chose to give support for Mobile Originating Short Message Service to certain individual subscribers or to groups of individual subscribers, in accordance with criteria established by the operator. The Number Portability Data Base (93) provides for a simple implementation of such a selection of individual subscribers or groups of subscribers.

By means of the SRF means (91), the CdPA is next changed to address the relevant IWMSC-SC for the specific subscriber (Fb912), and the MAP operation, as it was received in the Signaling Connection Control Part (hereinafter SCCP) layer (94) included in the SS7 protocol structure, is relayed to the corresponding IWMSC (Fb913). The way the SCCP layer means deals with SS7 issues, and other transport means, is not considered to require any further explanation.

But, according to FIG. 9 and provided that the subscriber does not have support for Mobile Originating Short Messages from the current PLMN (Fb920), the received CdPA and Calling Party Address (hereinafter CgPA) are exchanged (Fb921) in order to reject the received MAP operation, MO_FORWARD_SM. Basically, the subscribers without support for Originating Short Messages from the current PLMN can be the exported subscribers (subscribers who do no longer keep their subscription with the PLMN) and normal subscribers from any other PLMN, unless the operator of the PLMN (750) has established that support for Mobile Originating Short Message Service should be given to subscribers of the other PLMN (or to specific subscribers, specified individually or belonging to specific groups of subscribers).

The Rejection of the received MAP operation, namely MO_FORWARD_MS, should be understood by the receiver entity (MSC or SGSN) as an explicit indication that the previously addressed IWMSC-SC is not giving service for Mobile Originating Short Messages to the Originating Subscriber.

According to the FIG. 9, such a rejection above is carried out by issuing a TC-Reject primitive for the received MAP operation MO_FORWARD_SM, to the sender of such a MAP operation, that is, to the MSC or SGSN. The way the TC layer (95) means deals with SS7 protocol issues is not considered to require any further explanation.

For further increased clarity, it is submitted that the different boxes Fb901–Fb921 of FIG. 9 correspond to the following items:

Fb900: (relevant data received by the MAP analysis Function means:)-CdPA: IWMSC-SC Address
MO-Forward-SM (MSISDN)

Fb9O1: Check A-Subscriber MSISDN Portability (that is, check by means of using the Number Portability Data Base (93) whether the A-subscriber identified by the MSISDN is authorized or not authorized to store a Short Message in the SC of the PLMN Fb910: Result: Home, or Imported, or Exported with O-SMS (that is, the result from the Data Base query is that the A-subscriber corresponding to the MSISDN is authorized to store a Short Message in the SC of the PLMN)

Fb911: Relay MAP operation to IWMSC

Fb912: Change CdPA to address the applicable IWMSC-SC

Fb913: Data sent from SRF:
CdPA: IWMSC-SC Address
MO-Forward-SM (MSISDN)

Fb920: Result: Other, or Exported without O-SMS Support (that is, the result from the Data Base query is that the A-subscriber corresponding to the MSISDN is nor authorized to store a Short Message in the SC of the PLMN)

Fb921: Exchange CdPA & CgPA; Send REJECT

What is claimed is:

1. A method of controlling storage of short messages in short message service centers of a mobile network supporting number portability, the short messages having been sent from originating subscribers identified by corresponding subscriber numbers belonging to the mobile network, the method comprising the steps of:

receiving a short message from an originating subscriber in a serving exchange;

forwarding the short message from the serving exchange toward an interworking mobile switching center for storage in a short message service center;

interposing a number portability logical entity between the serving exchange and the interworking mobile switching center, the number portability logical entity being adapted to carry out the steps of:

(a) receiving an indication of a short message sent from an originating subscriber identified by a predetermined subscriber number and extracting the predetermined subscriber number;

(b) determining from a number portability database whether the originating subscriber is authorized to store a short message in a short message service center; and (c) if the originating subscriber is authorized, relaying the short message to the interworking mobile switching center for storage in the short message service center, and if the originating subscriber is not authorized, rejecting the short message toward the serving exchange.

2. The method of claim 1, wherein the number portability logical entity includes a mobile originating number portability register.

3. The method of claim 2, wherein short messages forwarded from the serving exchange are captured in the mobile originating number portability register through a Mobile Application Part operation Mobile_Originating_Forward_Short_Message (MO-FORWARD-SM).

4. The method of claim 3, wherein the serving exchange is a mobile switching center.

5. The method of claim 3, wherein the serving exchange is a serving GPRS support node.

6. The method of claim 3, wherein if the originating subscriber is not authorized, a rejected MO-FORWARD-SM operation is returned to the serving exchange from which the MO-FORWARD-SM operation was received, and the serving exchange is a mobile switching center or a serving GPRS support node.

7. The method of claim 3, wherein the originating subscriber who sent the short message is identified at the mobile originating number portability register by a mobile subscriber ISDN number.

8. The method of claim 7, wherein only originating subscribers who are subscribers of the mobile network owning the Short Message Service Center are authorized to store Short Messages in said Short Message Service Center.

9. The method of claim 7, wherein selected originating mobile subscribers who are not subscribers of the mobile network owning the Short Message Service Center are authorized to store Short Messages in said Short Message Service Center.

10. Apparatus for controlling storage of short messages in short message service centers of a mobile network supporting number portability, the short messages having been sent from originating subscribers identified by corresponding subscriber numbers belonging to the mobile network, the apparatus comprising at least one number portability logical entity that includes:

a number portability database of information specifying, for at least one subscriber identified by a corresponding subscriber number, whether the at least one subscriber is authorized to store a short message in a short message service center;

means for analyzing Mobile Application Part operations, including means for receiving an indication of a short message sent from an originating subscriber identified by a predetermined subscriber number, means for determining whether the originating subscriber identified by the predetermined subscriber number is authorized to store a short message in a short message service center, and means for rejecting the short message if the originating subscriber identified by the predetermined subscriber number is determined not to be so authorized; and means for relaying the short message towards an interworking mobile switching center for further storage in a short message service center before delivery of the short message.

11. The apparatus of claim 10, wherein the number portability logical entity is a mobile originating number portability register.

12. The apparatus of claim 11, wherein the analyzing means receives and extracts user data from a Mobile Application Part operation Mobile_Originating_Forward-Short-Message (MO-FORWARD-SM).

13. The apparatus of claim 12, wherein the relaying means relays the MO-FORWARD-SM operation where the short message was received.

14. The apparatus of claim 11, wherein a subscriber number that identifies an originating subscriber having sent a short message is a mobile subscriber ISDN number.

15. A system that provides a mobile-originated short message service in a mobile network supporting number portability, comprising:

a short message service center for storing a short message sent from an originating mobile subscriber via a serving exchange;

an interworking mobile switching center for receiving the short message from the serving exchange and for sending the short message to the short message service center before delivery to a called subscriber in a destination network; and an apparatus as defined by claim 10 that is functionally interposed between the serving exchange and the interworking mobile switching center and that determines whether an originating mobile subscriber is authorized to store a short message in the short message service center.

* * * * *